(12) United States Patent
Vijayakumar et al.

(10) Patent No.: US 11,936,207 B2
(45) Date of Patent: Mar. 19, 2024

(54) FOREIGN OBJECT DETECTION USING DECAY COUNTER FOR Q-ESTIMATION

(71) Applicant: Cypress Semiconductor Corporation, San Jose, CA (US)

(72) Inventors: Prasanna Venkateswaran Vijayakumar, Bangalore (IN); Vishwas Kedilaya, Bangalore (IN); Jeevith Kumar Nagamangala Muninarayanappa, Bengaluru (IN); Tudu Rushika Banam Balia, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 233 days.

(21) Appl. No.: 17/669,113

(22) Filed: Feb. 10, 2022

(65) Prior Publication Data
US 2023/0253836 A1    Aug. 10, 2023

(51) Int. Cl.
*H02J 50/60* (2016.01)
*G01V 3/12* (2006.01)
*H02J 50/12* (2016.01)
*H02J 7/02* (2016.01)

(52) U.S. Cl.
CPC ............ *H02J 50/60* (2016.02); *G01V 3/12* (2013.01); *H02J 50/12* (2016.02); *H02J 7/02* (2013.01)

(58) Field of Classification Search
CPC .. G01V 3/12; H02J 50/60; H02J 50/12; H02J 50/80; H02J 7/02; H02J 7/00034
See application file for complete search history.

(56) References Cited

U.S. PATENT DOCUMENTS

| | | | |
|---|---|---|---|
| 10,978,921 B1* | 4/2021 | Wang | H04B 5/0037 |
| 2015/0097442 A1* | 4/2015 | Muurinen | H04B 5/0037 |
| | | | 307/104 |
| 2015/0108849 A1* | 4/2015 | Robertson | H02J 50/12 |
| | | | 307/104 |
| 2015/0123606 A1* | 5/2015 | Tew | H02J 50/80 |
| | | | 320/108 |
| 2016/0141882 A1* | 5/2016 | Ichikawa | H02J 50/80 |
| | | | 307/104 |
| 2016/0149442 A1* | 5/2016 | Asanuma | G01V 3/10 |
| | | | 307/104 |
| 2018/0097401 A1* | 4/2018 | Gaskill | H02J 7/0042 |
| 2018/0131235 A1* | 5/2018 | Inoue | H02J 50/12 |
| 2019/0337404 A1* | 11/2019 | Matsuo | H01F 27/02 |
| 2021/0351631 A1* | 11/2021 | Park | H02J 50/80 |
| 2022/0352761 A1* | 11/2022 | Kovacs | H02J 50/12 |

(Continued)

*Primary Examiner* — Patrick Assouad
*Assistant Examiner* — Demetrius R Pretlow

(57) ABSTRACT

A method of foreign object detection by a wireless power delivery system is disclosed. A decaying coil voltage signal of a transmitting coil of the wireless power delivery system is detected. A first comparator is used to trigger a cycle count of the decaying coil voltage signal. When the first comparator triggers the cycle count, a second comparator is used to count a number of cycles of the decaying coil voltage signal. A quality factor (Q-factor) of the transmitting coil is determined based on the number of cycles of the decaying coil voltage signal, a reference signal of the first comparator, and a reference signal of the second comparator. Whether a foreign object is present is determined based on the Q-factor and a foreign object detection (FOD) threshold level.

20 Claims, 6 Drawing Sheets

(56) References Cited

U.S. PATENT DOCUMENTS

| | | | |
|---|---|---|---|
| 2023/0052693 A1* | 2/2023 | Song | H02M 1/009 |
| 2023/0082647 A1* | 3/2023 | Tachiwa | H02J 50/80 |
| | | | 307/104 |
| 2023/0097511 A1* | 3/2023 | Tachiwa | H02J 50/80 |
| | | | 320/108 |
| 2023/0238836 A1* | 7/2023 | Jin | H02J 50/12 |
| | | | 320/108 |
| 2023/0369892 A1* | 11/2023 | Partovi | H02J 50/70 |

* cited by examiner

FOREIGN OBJECT DETECTION USING DECAY COUNTER FOR Q-ESTIMATION

FIELD OF THE INVENTION

Embodiments of the present disclosure relate generally to wireless charging technologies. More specifically, embodiments of the disclosure relate to foreign object detection using decay counter for Q-estimation.

BACKGROUND

Qi standard for wireless charging requires an extended power profile (EPP) transmitter to detect the presence of foreign object (FO) on a transmitter surface prior to power delivery using the quality factor (Q-factor) metric. The transmitter has to measure the Q-factor and compare the Q-factor with a reference value communicated by the receiver during negotiation phase and decide on FO presence and whether to proceed with the power delivery.

Various methods exist for Q-factor measurement and Qi standard does not stipulate any particular method. However, Qi standard does recommend the use of lower excitation energy on the transmitter side so as to minimize the influence on receiver side components in altering Q-measurement.

Frequency based methods require the excitation to be swept over a range of frequencies and compute quality factor Q based on bandwidth. Time based methods require very low impedance source and very high impedance sense to excite a small root mean square (RMS) voltage and use the ratio of sensed voltage to source to estimate Q. Another method combines time and frequency to compute Q based on a decay rate that requires fast peak detectors and frequency counters. Lastly, a simpler Q estimation based on a decay count does not require such complexity, though it does require an accurate counting/calibration for better repeatability with low excitation energy for wider dynamic range.

Unfortunately, the above-discussed methods require additional external components, expensive high frequency peak detectors, and/or fast analog-to-digital converters (ADCs) and microcontroller units (MCUs).

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
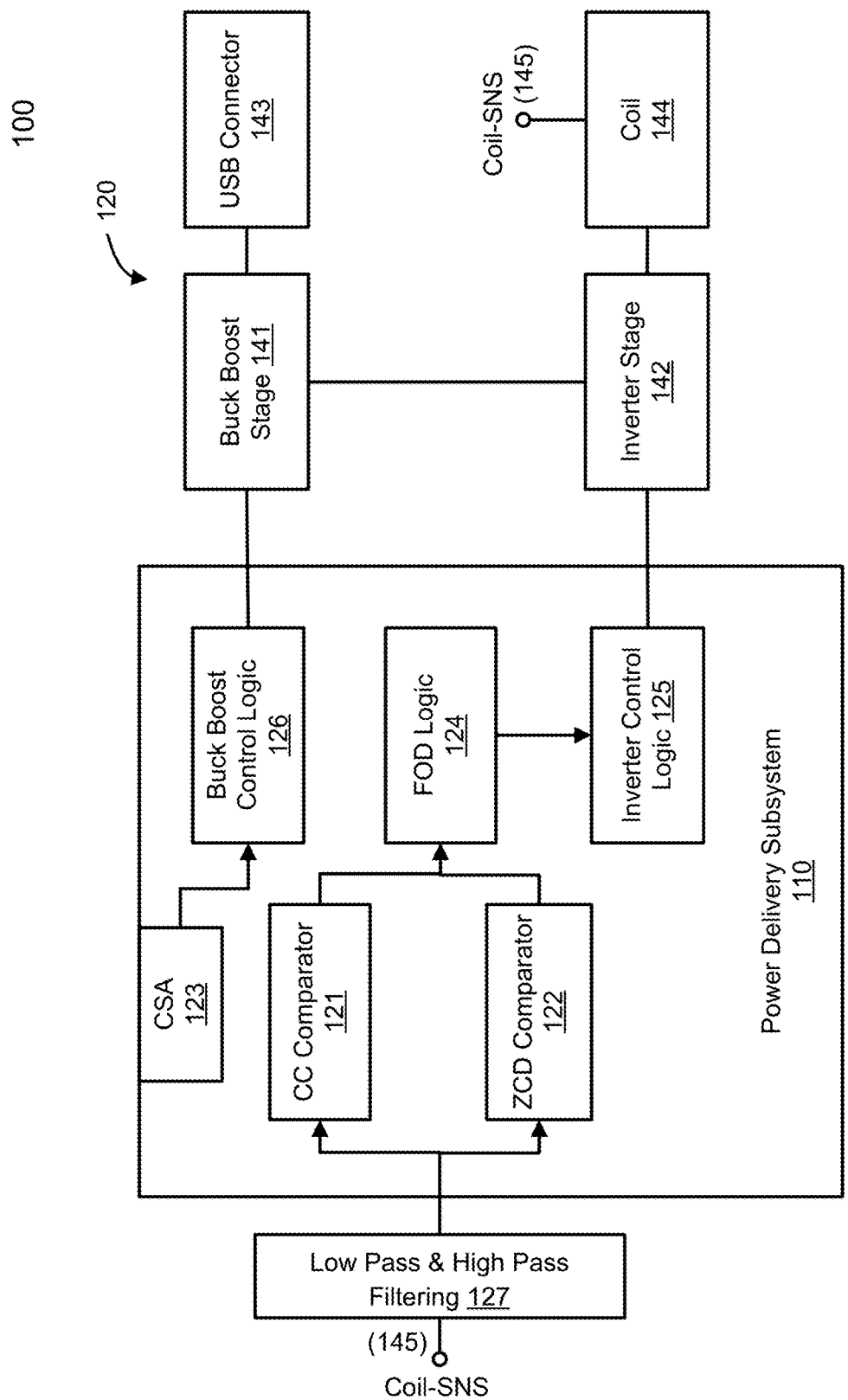
FIG. 1 is a block diagram illustrating an example of a power delivery system according to an embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Random access refers to access (read/write) to a random offset of a file at least once during a read/write input/output operation.

Embodiments of the disclosure use configuration channel (CC) and zero crossing detection (ZCD) comparators where one is used for triggering a counter of another via firmware interrupt. Further, the CC line also provides an internal resistor to ground option, which enables scaling of incoming sense signals to further improve ZCD count accuracy for lower Q-factor measurements without clamping the voltage for higher Q-factor scenarios.

A first aspect of the disclosure provides a method of foreign object detection by a wireless power delivery system is disclosed. A decaying coil voltage signal of a transmitting coil of the wireless power delivery system is detected. A first comparator is used to trigger a cycle count of the decaying coil voltage signal, where the decaying coil voltage signal is an input signal of the first comparator. When the first comparator triggers the cycle count, a second comparator is used to count a number of cycles of the decaying coil voltage signal, where the decaying coil voltage signal is an input signal of the second comparator. A quality factor (Q-factor) of the transmitting coil is determined based on the number of cycles of the decaying coil voltage signal, a reference signal of the first comparator, and a reference signal of the second comparator. Whether a foreign object is present is determined based on the Q-factor and a foreign object detection (FOD) threshold level.

A second aspect of the disclosure provides a power delivery system that includes a transmitting coil, a first comparator, a second comparator, and a processor. In some embodiments, the processor is configured to detect a decaying coil voltage signal of a transmitting coil, and use a first comparator to trigger a cycle count of the decaying coil voltage signal, where the decaying coil voltage signal is an input signal of the first comparator. The processor is further configured to when the first comparator triggers the cycle count, use a second comparator to count a number of cycles of the decaying coil voltage signal, where the decaying coil voltage signal is an input signal of the second comparator. The processor is further configured to determine a quality factor (Q-factor) of the transmitting coil based on the number of cycles of the decaying coil voltage signal, a reference signal of the first comparator, and a reference signal of the second comparator. The processor is further configured to determine whether a foreign object is present based on the Q-factor and a foreign object detection (FOD) threshold level.

FIG. 1 is a block diagram illustrating an example of a power delivery system according to an embodiment. Referring to FIG. 1, power delivery system 100 includes power delivery subsystem 110 and power transmitting device 120.

Power delivery subsystem 110 may provide the interface to a power connector, such as universal serial bus (USB) connector 143 (e.g., USB Type-C port) of power transmitting device 120. Subsystem 110 (e.g., a USB-Power Delivery (PD) integrated circuit (IC) controller) may include one or more logic blocks and other analog/digital hardware circuitry, which may be controllable by firmware and which is configured and operable to perform the functions and to satisfy the requirements specified in at least one release of a USB-PD specification. The USB-PD specification defines a standard protocol designed to enable the maximum functionality of USB-enabled devices by providing more flexible power delivery along with data communications over a single USB cable through USB ports (e.g., USB Type-C). The USB-PD specification also describes the architecture, protocols, power supply behavior, parameters, and cabling necessary for managing power delivery over USB cables (e.g., up to 5 A of current at up to 20V, for a total of up to 100 W of power). The USB-PD specification also defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging).

Among other circuitry, power transmitting device 120 may include buck-boost stage 141, inverter stage 142, USB connector 143 (e.g., USB Type-C connector), and transmitting coil 144. Generally, when a power receiving device (e.g., a device to be wirelessly charged) having a receiving coil is placed in proximity of the power transmitting device 120, AC power signal from transmitting coil 144 is inductively coupled to the receiving coil, thereby enabling transmitting coil 144 to transfer power to the receiving coil of the power receiving device. However, in some instances, a foreign object may be placed in proximity of power transmitting device 120 (or no object is placed in proximity of power transmitting device 120), and therefore, power delivery system 100 needs to determine whether transmitting coil 144 is a free coil (i.e., transmitting coil 144 is available as no object is present), whether a receiving coil is present, or whether a foreign object is present.

In an embodiment, DC voltage from a buck-boost stage 141 (e.g., of a DC/DC converter) may be supplied to inverter stage 142 (e.g., full-bridge or half-bridge inverter stage) of the power transmitting device 120. The inverter stage 142 may convert the DC voltage to an AC square wave to feed a resonant tank formed by the transmitting coil 144 and a resonant capacitor (not shown). The power transmitting device 120 may control the voltage, frequency, phase angle or duty cycle of inverter stage 142 to regulate the power transfer (e.g., at a power receiving device). Operating parameters of inverter stage 142, such as output voltage and bridge current, may be a function of the frequency, coupling, DC input voltage, load of the power receiving device, coil parameters of the power receiving device, etc.

In an embodiment, USB connector 143 may be a power connector providing power to power transmitting device 120. USB connector 143 may be configured according to the USB Type-C specification. In an embodiment, USB connector 143 may negotiate power with a connected source (e.g., AC/DC adaptor) and use an integrated buck-boost controller (e.g., buck boost control logic 126) in "buck only" configuration to supply the required voltage and current.

Among other circuitry, power delivery subsystem 110 may include configuration channel (CC) comparator 121, zero crossing detection (ZCD) comparator 122, current sense amplifier (CSA) 123, foreign object detection (FOD) logic 124, inverter control logic 125 and buck boost control logic 126.

Figure 6:
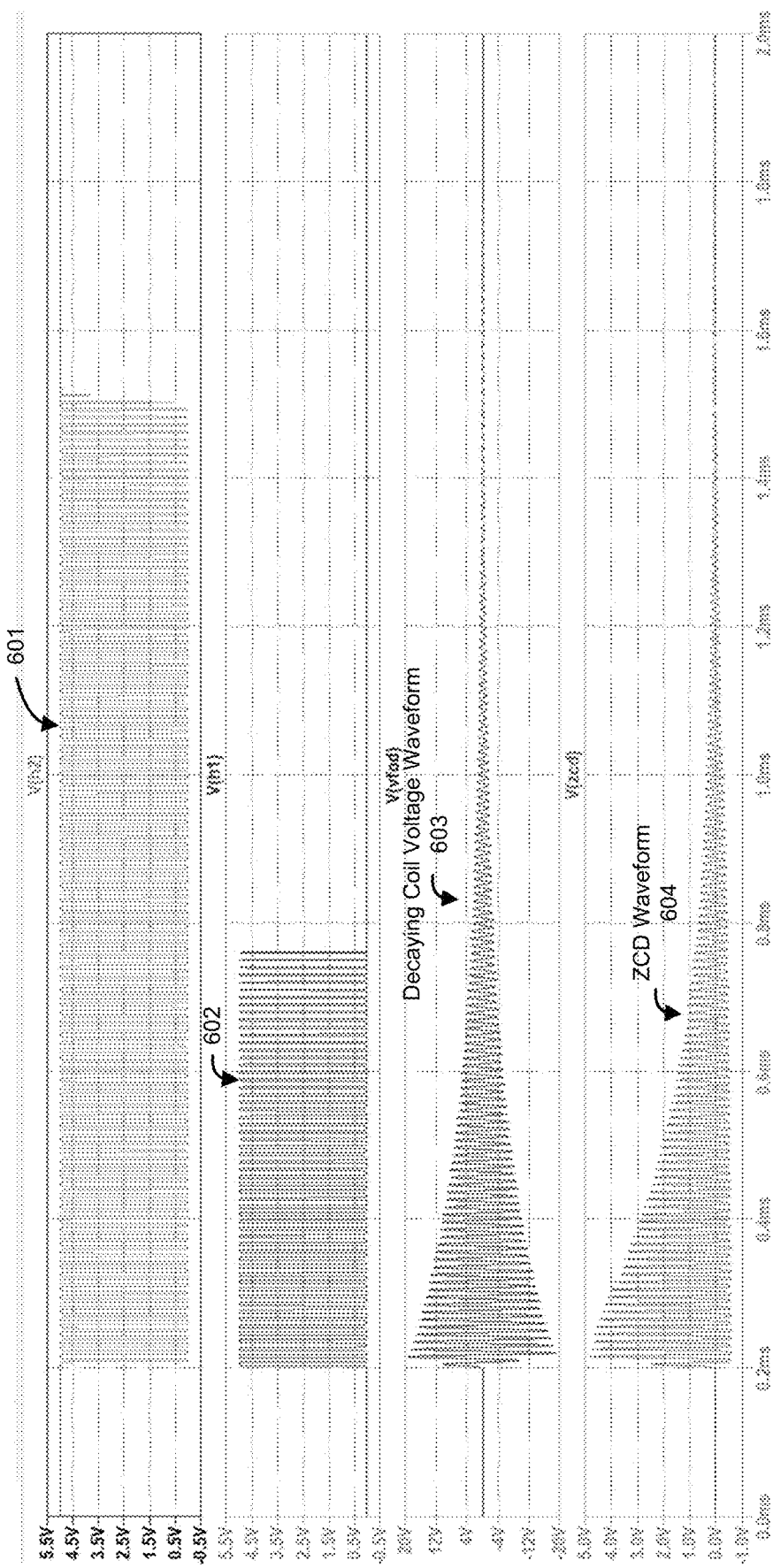
FIG. 6 is a block diagram illustrating reference voltage waveforms of a configuration channel (CC) comparator and zero crossing detection (ZCD) comparator, a decaying coil voltage waveform, and a ZCD waveform.

In an embodiment, based on a reference voltage and a decaying coil voltage waveform detected at coil voltage 145, CC comparator 121 (or a similar coarse comparator) may be configured to determine a starting point of cycle count of a decaying coil voltage waveform. That is, the output voltage of comparator 121 may be used to trigger a counter, for example, via firmware interrupt. For example, FOD logic 124 may be configured to excite a resonant tank with a small pulse (also referred to as ping pulse). The ping pulse creates sufficient energy in the resonant tank, which may be formed by transmitting coil 144 and a resonant capacitor (not shown) connected to coil 144, such that the resonant tank produces a decaying coil voltage waveform (e.g., decaying coil voltage waveform 603 of FIG. 6) after the excitation. As described in more detail herein below, the decaying coil voltage waveform may include, but not limited to, information to detect whether transmitting coil 144 is a free coil (i.e., transmitting coil 144 is available as no object is present), whether a receiving coil is present, or whether a foreign object is present. In an embodiment, the reference voltage of CC comparator 121 may be set to 200 mV or any suitable voltage. In another embodiment, the reference voltage may be varied to enable multiple points of comparison using a variable reference for comparator 121.

In an embodiment, based on a reference voltage and a decaying coil voltage waveform (or signal) detected at coil voltage 145, ZCD comparator 122 may be configured to count a number of cycles (N cycles, where N is a positive integer) of the decaying coil voltage waveform. The output voltage of comparator 122 may be used for period counting, i.e., frequency measurement. For example, the output of comparator 122 (e.g., ZCD waveform or signal 604 of FIG. 6 which is also a decaying waveform) may be used to increment a resonance cycle counter, which can be used to obtain a resonant frequency and decay time or rate. In an embodiment, the reference voltage of comparator 122 may be set to 30 mV, 60 mV or any suitable voltage. In another embodiment, the reference voltage may be varied to enable multiple points of comparison using a variable reference for comparator 122.

Figure 3:
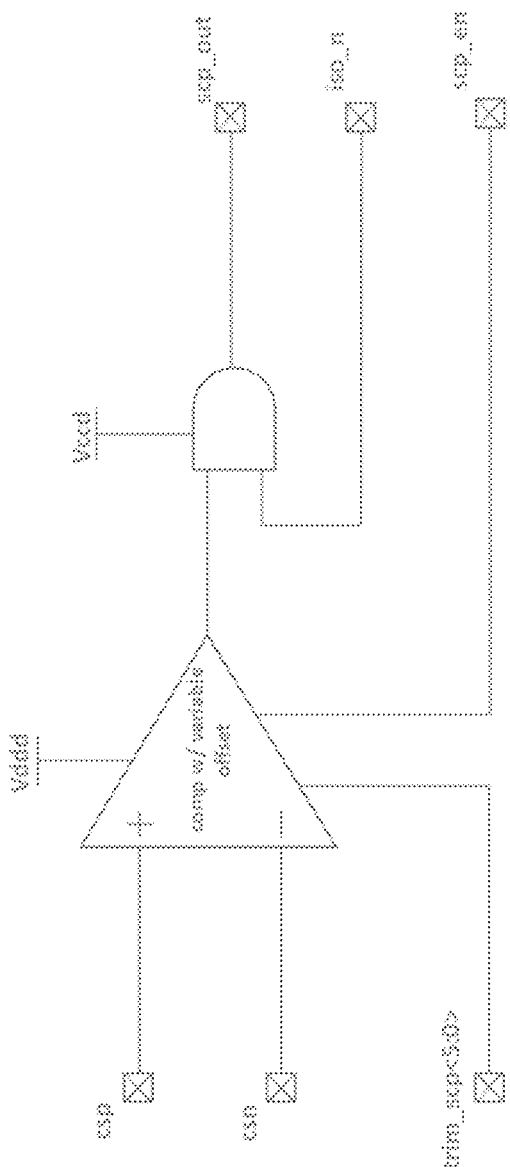
FIG. 3 is a block diagram illustrating an example of a zero crossing detection (ZCD) comparator according to an embodiment.

FIG. 3 is a block diagram illustrating an example of the ZCD comparator 122. In FIG. 3, comparator 300 may include variable offset options from 0 to 50 mV and may be configured with 3 mV or less in sensing accuracy for faster response time, though those voltage values are non-limiting.

Referring back to FIG. 1, FOD logic 124 is configured to determine the presence of a foreign object. The presence of the foreign object before power delivery may reflect in form of lower Q-factor and change in resonance frequency. In an embodiment, FOD logic 124 may be configured to excite a resonant tank (formed by coil 144 and a resonant capacitor) with few pulses (also referred to as ping pulses), via inverter control logic 125 and inverter stage 142, to produce a decaying coil voltage waveform detected at coil voltage 145. In some embodiments, the excitation of the resonant tank may be variable, for example, the ping pulses may be transmitted at a random interval. Based on the decaying coil voltage waveform, FOD logic 124 may estimate or determine the Q-factor and resonance frequency. In general, the coil voltage after excitation decays slower when a power receiving device is not present as compared to a scenario when the power receiving device or a foreign object is present on an interface surface having transmitting coil 144. When the power receiving device is placed on the interface surface for wireless charging, FOD logic 124 (via power transmitting device 120) may measure the coil Q-factor of coil 144. The use of the Q-factor and resonance frequency values can decide on the presence of a foreign object.

In an embodiment, during the negotiation phase, FOD logic 124 (via power transmitting device 120) may receive a reported reference Q-factor to determine an appropriate FOD threshold level. In another embodiment, the FOD threshold level may be configurable or preset by a customer based on system design. If the measured Q is less than the threshold level, FOD logic 124 may determine that a foreign object is present. On the other hand, if the measured Q meets or exceeds the threshold level, FOD logic 124 may determine that there is no presence of a foreign object.

In an embodiment, inverter control logic (or inverter controller) 125 may provide the required output to a power receiving device by controlling the gain of the resonant tank via frequency or voltage from output of buck-boost control logic (or buck-boost controller) 126. In some embodiments, inverter controller 125 may be configured as a full bridge or half bridge inverter controller.

In an embodiment, buck-boost control logic (or buck-boost controller) 126 provides the required output voltage in constant voltage mode for Qi/proprietary wireless power transmitter. Controller 126 may be configured as buck, boost, or buck-boost controller. In an embodiment, buck-boost controller 126 may implement peak current control in boost and buck mode. Current sense amplifier (CSA) 123 may be used for peak current sensing through an external resistor placed in VIN path (not shown) of controller 126. CSA 123 may also generate a slope compensation ramp which is added on a current sense ramp signal for internal current loop stability.

Low pass and high pass filtering 127 (which may be part of power delivery subsystem 110 or power transmitting device 120) attenuates the voltage at coil voltage 145 above and below, respectively, a cutoff frequency, thereby allowing lower frequencies (low pass) and/or higher frequencies (high pass) to pass through filtering 127. Output from low pass and high pass filtering 127 are provided to comparators 121-122 as their input voltage.

Figure 2:
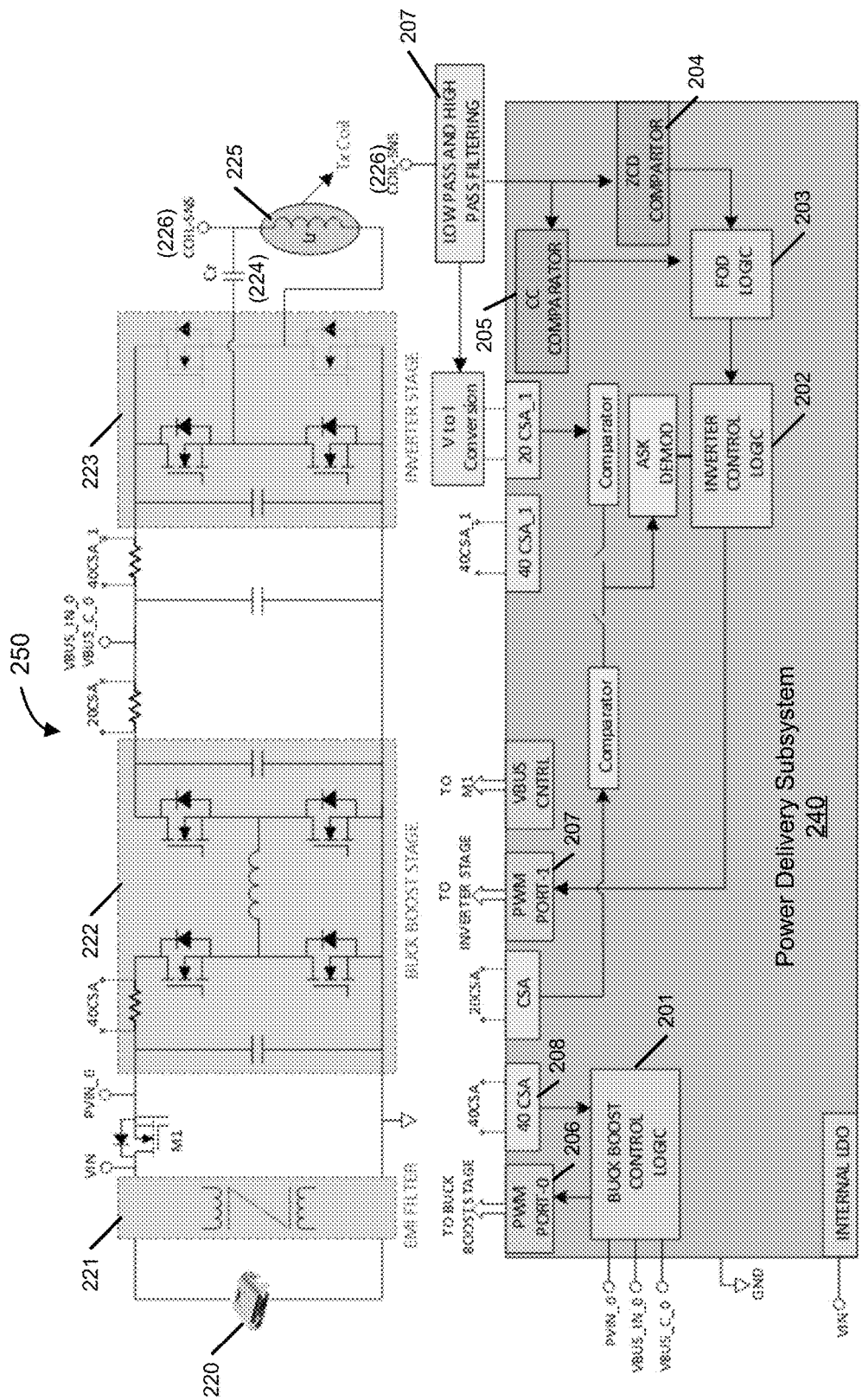
FIG. 2 is a block diagram illustrating another example of a power delivery system according to an embodiment.

FIG. 2 is a block diagram illustrating another example of a power delivery system according to an embodiment. Referring to FIG. 2, power delivery system 200 includes power delivery subsystem 240 and power transmitting device 250.

Power transmitting device 250, among other circuitry, may include USB connector 220 (e.g., USB Type-C connector), electromagnetic interference (EMI) filter 221, buck-boost stage 222, inverter stage 223, and transmitting coil 225. When a power receiving device is placed in proximity of the power transmitting device 250 (e.g., on an interface surface), AC power signal from transmitting coil 225 is inductively coupled to the receiving coil of the power receiving device to enable transmitting coil 225 to transfer power to the receiving coil. In some cases, a foreign object may be placed in proximity of power transmitting device 250 (or no object is placed in proximity of device 250). Therefore, as part of foreign object detection, power delivery system 200 needs to determine whether transmitting coil 225 is a free coil (i.e., transmitting coil 225 is available as no object is present), whether a receiving coil is present, or whether a foreign object is present.

Buck-boost stage 222 (e.g., of a DC/DC converter) may provide DC voltage to inverter stage 223 (e.g., full-bridge or half-bridge inverter stage). The inverter stage 223 may convert the DC voltage to an AC square wave to feed a resonant tank formed by the transmitting coil 225 and resonant capacitor 224. In an embodiment, power transmitting device 250 may control the voltage, frequency, phase angle or duty cycle of inverter stage 223 to regulate the power transfer. Operating parameters of inverter stage 223, such as output voltage and bridge current, may be a function of the frequency, coupling, DC input voltage, load of the power receiving device, coil parameters of the power transmitting and receiving device, etc.

USB connector 220 may be a power connector providing power to buck-boost stage 222. In an embodiment, USB connector 220 may be configured according to the USB Type-C specification. In an embodiment, USB connector 143 may negotiate power with a connected source (e.g., AC/DC adaptor) and use buck-boost controller 202 in "buck only" configuration to supply the required voltage and current. As shown in FIG. 2, signals from USB connector 220 may be supplied to EMI filter 221 (which is connected in parallel with buck-boost stage 222 through switching device Ml, e.g., a metal oxide semiconductor field-effect transistor (MOSFET)) to prevent AC switching signals present on the power core's input from reaching buck-boost stage 222.

Power delivery subsystem 240, among other circuitry, may include, buck boost logic 201, inverter control logic 202, FOD logic 203, ZCD comparator 204, CC comparator 205, pulse width modulation (PWM) ports 206-207, and CSA 208.

Based on a reference voltage and a decaying coil voltage waveform detected at coil voltage 226, ZCD comparator 204 may count a number of cycles (N cycles) of the decaying coil voltage waveform. The output voltage of ZCD comparator 204 may be used for period counting (that is, frequency measurement). In an embodiment, the output of comparator 122 (e.g., ZCD waveform (or signal) 604 of FIG. 6) may be used to increment a resonance cycle counter, which can be used to obtain a resonant frequency and decay time or decay rate. In an embodiment, the reference voltage of comparator 204 may be set to 30 mV, 60 mV or any suitable voltage. In another embodiment, the reference voltage may be varied to enable multiple points of comparison using a variable reference for comparator 204.

Based on a reference voltage and a decaying coil voltage waveform detected at coil voltage 226, CC comparator 205 (or a similar coarse comparator) may be configured to determine a starting point of cycle count of a decaying coil voltage waveform. For example, FOD logic 124 may be configured to excite transmitting coil 225 with pulses (also referred to as ping pulses). The ping pulses create energy in a resonant tank formed by transmitting coil 225 and resonant capacitor 224 to produce a decaying coil voltage waveform (e.g., decaying coil voltage waveform 603 of FIG. 6). The decaying coil voltage waveform may include, but not limited to, information to detect whether transmitting coil 225 is a free coil (i.e., transmitting coil 225 is available as no object is present), whether a receiving coil is present, or whether a foreign object is present. In an embodiment, the reference voltage of CC comparator 205 may be set to 200 mV or any suitable voltage. In another embodiment, the reference voltage may be varied to enable multiple points of comparison using a variable reference for comparator 205.

Using the output waveforms or signals from comparators 204-205, FOD logic 203 may determine the presence of a foreign object. The presence of the foreign object before power delivery may reflect in form of lower Q-factor and/or change in resonance frequency. In an embodiment, FOD logic 203 may excite a resonant tank (formed by coil 225 and resonant capacitor 224) with ping pulses (using inverter control logic 202 to send PWM signals from PWM port 207 to inverter stage 223) to produce a decaying coil voltage waveform at coil voltage 226. Based on the decaying coil voltage waveform, FOD logic 203 may estimate or determine the Q-factor and resonance frequency. In an embodiment, when a power receiving device is placed on the interface surface, FOD logic 203 may measure the coil Q-factor of coil 225. The use of the Q-factor and resonance frequency values can decide on the presence of a foreign object. Moreover, during the negotiation phase, FOD logic 203 may receive a reported reference Q-factor to determine an FOD threshold level. Alternatively, the FOD threshold level may be configurable or preset by a customer based on system design. If the measured Q is less than the threshold level, FOD logic 203 may determine that a foreign object is present. On the other hand, if the measured Q meets or exceeds the threshold level, FOD logic 124 may determine that there is no presence of a foreign object.

Inverter control logic 202 may provide the required output to a power receiving device by controlling the gain of the resonant tank via frequency or voltage from output of buck-boost control logic 201. Inverter control logic 202 may control the operational parameters of inverter stage 223 through PWM port 207. In some embodiments, inverter controller 202 may be configured as a full bridge or half bridge inverter controller.

Buck-boost control logic 201 may supply the required output voltage in constant voltage mode for Qi/proprietary wireless power transmitter. Logic 201 may control buck-boost stage 222 through PWM port 206. Logic 201 may be configured as buck, boost, or buck-boost controller. In an embodiment, logic 201 may implement peak current control in boost and buck mode. CSA 208 may be used for peak current sensing through an external resistor placed in PVIN_0 path of logic 201. CSA 208 may also generate a slope compensation ramp which is added on a current sense ramp signal for internal current loop stability.

Low pass and high pass filtering 207 (which may be part of power delivery subsystem 240 or power transmitting device 250) attenuates the voltage at coil voltage 206 above or below, respectively, a cutoff frequency to allow lower frequencies (low pass) or higher frequencies (high pass) to pass through filtering 207. Output from low pass and high pass filtering 207 are provided to comparators 204-205 as their input voltage.

Figure 4:
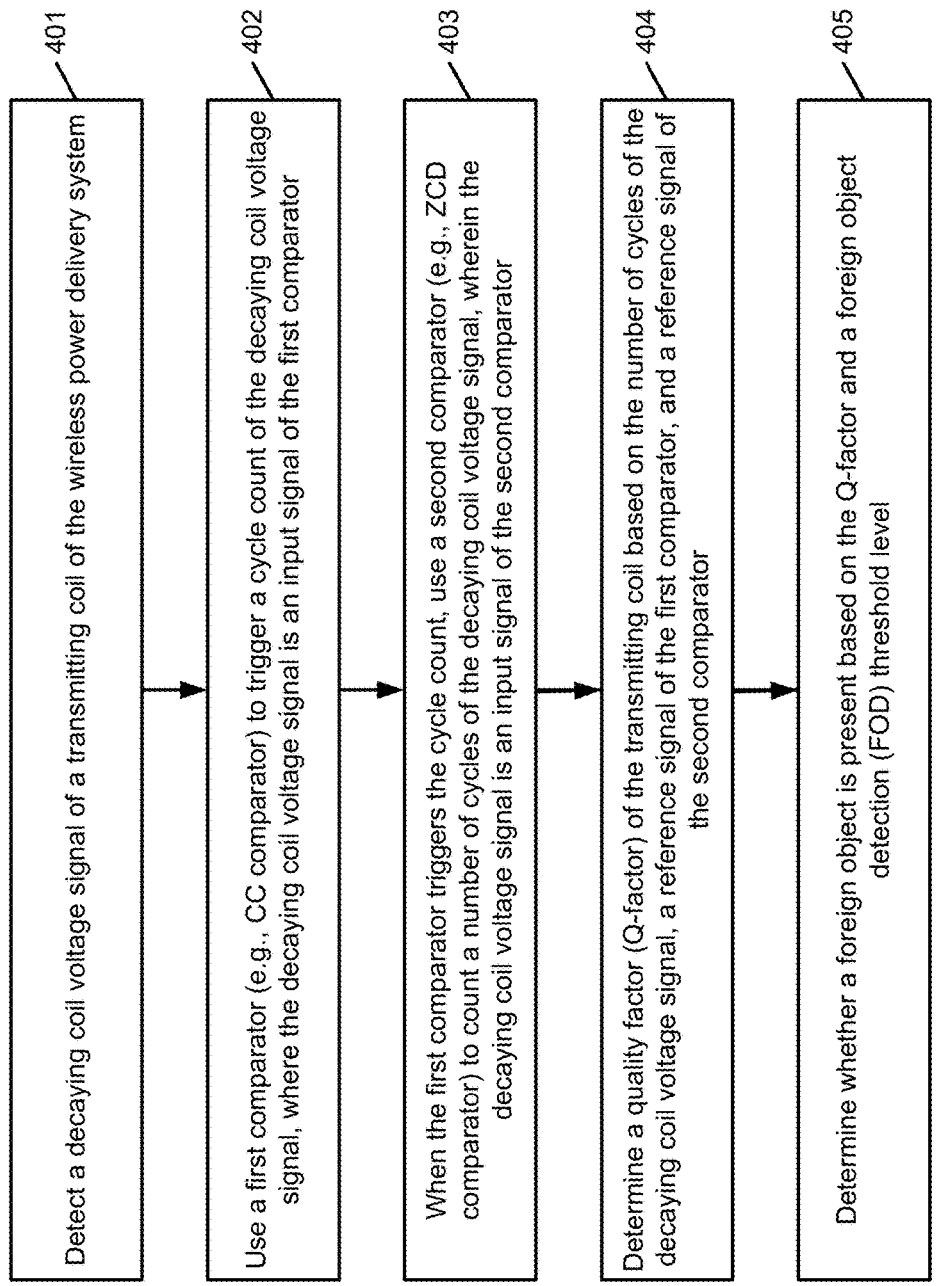
FIG. 4 is a flow diagram illustrating an example of a method of foreign object detection according to an embodiment.

FIG. 4 is a flow diagram illustrating an example of a method of foreign object detection according to an embodiment. In some embodiments, method 400 may be performed by FOD logic 124 of FIG. 1 and FOD logic 203 of FIG. 2.

Referring to FIG. 4, at block 401, a decaying coil voltage signal of a transmitting coil of the wireless power delivery system is detected. At block 402, a first comparator (e.g., CC comparator) is used to trigger a cycle count of the decaying coil voltage signal, where the decaying coil voltage signal is an input signal of the first comparator. At block 403, when the first comparator triggers the cycle count, a second comparator (e.g., ZCD comparator) is used to count a number of cycles of the decaying coil voltage signal, where the decaying coil voltage signal is an input signal of the second comparator. At block 404, a Q-factor of the transmitting coil is determined based on the number of cycles of the decaying coil voltage signal, a reference signal of the first comparator, and a reference signal of the second comparator. At block 405, whether a foreign object is present is determined based on the Q-factor and a FOD threshold level.

Figure 5:
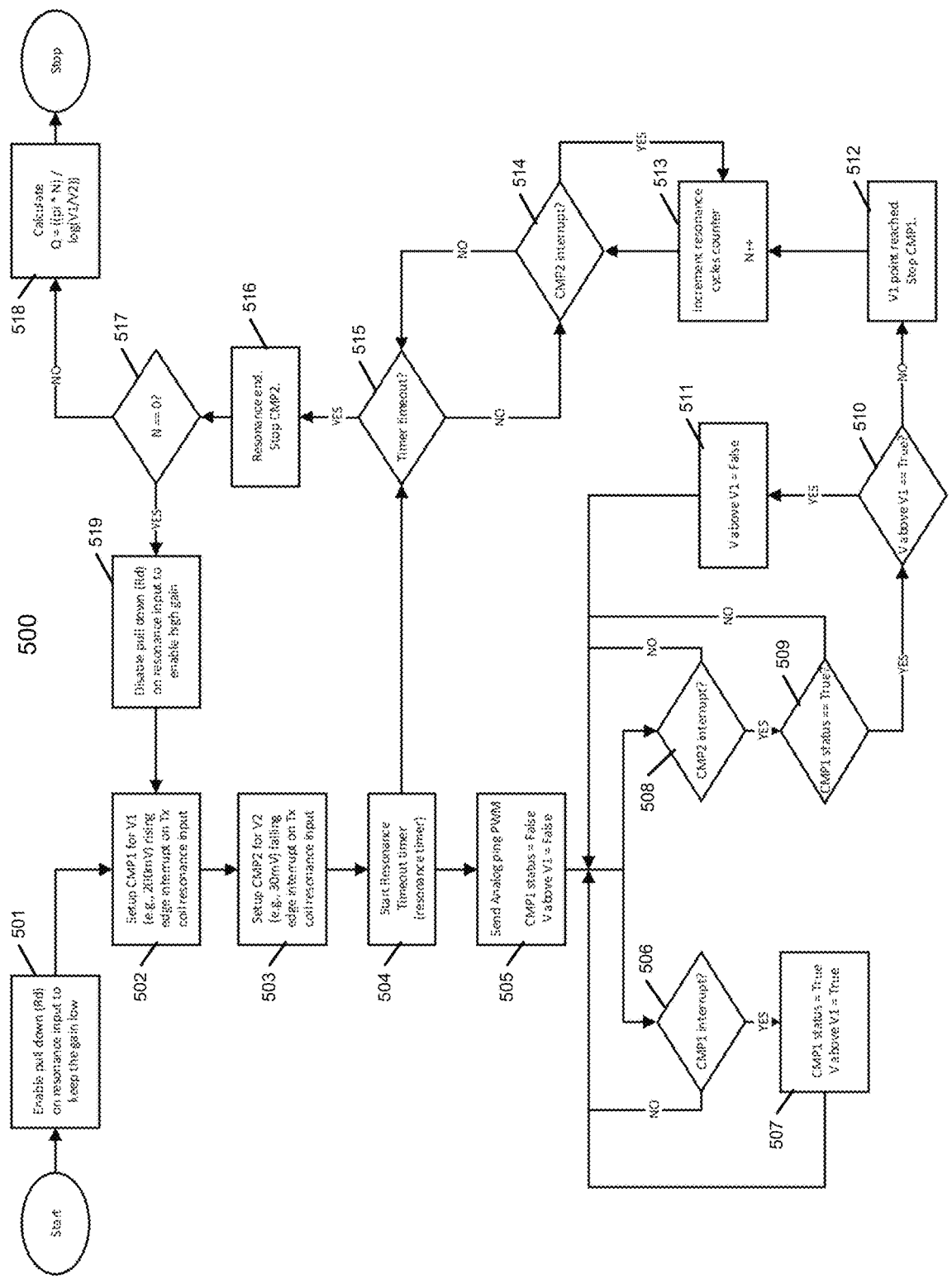
FIG. 5 is a flow diagram illustrating another example of a method of foreign object detection according to an embodiment.

FIG. 5 is a flow diagram illustrating another example of a method of foreign object detection according to an embodiment. In some embodiments, method 500 may be performed by FOD logic 124 of FIG. 1 and FOD logic 203 of FIG. 2.

Referring to FIG. 5, at block 501, pull down is enabled on a resonance input, for example, to keep the gain low. At block 502, a first comparator CMP1 (e.g., CC comparator) is setup for a first reference voltage (V1), e.g., 200 mV, rising edge interrupt on a transmitting coil (e.g., coil 144 of FIG. 1) resonance input. In an embodiment, V1 may be a variable reference voltage to enable multiple points of comparison for CMP1. For example, each time block 502 is executed, V1 may be setup for a different voltage value.

At block 503, a second comparator CMP2 (e.g., ZCD comparator) is setup for a second reference voltage (V2), e.g., 30 mV, falling edge interrupt on the transmitting coil resonance input. In an embodiment, V2 may be a variable reference voltage to enable multiple points of comparison for CMP2. For example, each time block 503 is executed, V2 may be setup for a different voltage value. At block 504, a resonance timer is started then method 500 proceeds to block 515 (described herein below). At block 505, analog PWM ping pulses are sent to excite the transmitting coil, with CMP1 status being set to False (e.g., 0) and 'V above V1' also being set to False (e.g., 0). In this scenario, V is the input voltage to CMP1 and CMP2 (e.g., decaying coil voltage waveform 603 of FIG. 6). Examples of V1 and V2 are illustrated in waveforms or signals 602 and 601 of FIG. 6, respectively.

With continued reference to FIG. 5, at block 506, it is determined whether CMP1 interrupt is triggered. For example, CMP1 interrupt may be triggered when V is above V1. If the CMP1 interrupt is triggered, method 500 proceeds to block 507. Otherwise, method 500 returns to block 506.

At block 507, CMP1 status is set to True (e.g., 1) and 'V above V1' is also set to True (e.g., 1).

In parallel with block 506, at block 508, it is determined whether CMP2 interrupt is triggered. CMP2 interrupt may be triggered when V crosses V2. An example of output voltage from CMP2 that triggers the CMP2 interrupt is shown in ZCD waveform 604 of FIG. 6, which may be the negative portion of decaying coil voltage waveform 603. If the CMP2 interrupt is triggered, method 500 proceeds to block 509. Otherwise, method 500 returns to block 508.

At block 509, it is determined whether CMP1 status is True. If so, method 500 proceeds to block 510. Otherwise, method 500 returns to block 508.

At block 510, it is determined whether 'V above V1' is True. If so method 500 proceeds to block 511 where 'V above V1' is set to False, then returns to block 508. Otherwise, method 500 proceeds to block 512 where it is determined V has reached V1 and CMP1 can be stopped.

At block 513, a resonance cycles counter (N) is incremented. At block 514, it is determined whether CMP2 interrupt is triggered (e.g., based on output waveform of CMP2). If so, method 500 returns to block 513 to increment the resonance cycles counter again. Otherwise, method 500 proceeds block 515.

At block 515, it is determined whether the resonance timer has timed out. If so method 500 proceeds to block 516. Otherwise, method 500 returns to block 514.

At block 516, method 500 ends the resonance and stops CMP2.

At block 517, it is determined whether N is 0. If so, method 500 proceeds to block 519. Otherwise, method 500 proceeds to block 518.

At block 518, a Q-factor is calculated according to the following:

$$Q = \frac{\pi * N}{\log\left(\frac{V_1}{V_2}\right)}$$

At block 519, the pull down is disabled on the resonance input to enable high gain. Subsequently, method 500 returns to block 502.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112(f) or 35 U.S.C. 112, sixth paragraph, for that unit/circuit/component.

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of foreign object detection by a wireless power delivery system that comprises a Universal Serial Bus-Power Delivery (USB-PD) controller, the method comprising:
   detecting, by the USB-PD controller, a decaying coil voltage signal of a transmitting coil of the wireless power delivery system;
   using a first comparator of the USB-PD controller to trigger a cycle count of the decaying coil voltage signal, wherein the decaying coil voltage signal is an input signal of the first comparator;
   when the first comparator triggers the cycle count, using a second comparator of the USB-PD controller to count a number of cycles of the decaying coil voltage signal, wherein the decaying coil voltage signal is an input signal of the second comparator;
   determining a quality factor (Q-factor) of the transmitting coil based on the number of cycles of the decaying coil voltage signal, a reference signal of the first comparator, and a reference signal of the second comparator; and
   determining whether a foreign object is present based on the Q-factor and a foreign object detection (FOD) threshold level.

2. The method of claim 1, further comprising: prior to detecting the decaying coil voltage signal of the transmitting coil, variably exciting a resonant tank formed by the transmitting coil and a resonant capacitor.

3. The method of claim 1, wherein the FOD threshold level is preset or determined based on a reported reference Q-factor.

4. The method of claim 1, wherein using the first comparator to trigger the cycle count of the decaying coil voltage signal comprises:
   setting up the first comparator for a first interrupt to be triggered based on a rising edge of the reference signal of the first comparator and the decaying coil voltage signal.

5. The method of claim 4, wherein using the second comparator to count the number of cycles of the decaying coil voltage signal comprises:
   setting up the second comparator for a second interrupt to be triggered based on a falling edge of the reference signal of the second comparator and the decaying coil voltage signal.

6. The method of claim 5, further comprising:
   when the first interrupt and the second interrupt are triggered, determining whether a voltage of the decaying coil voltage signal is above a voltage of the reference signal of the first comparator; and
   in response to determining that the voltage of the decaying coil voltage signal is not above the voltage of the reference signal of the first comparator, stopping the first comparator and incrementing the number of cycles of the decaying coil voltage signal.

7. The method of claim 6, further comprising:
   starting a resonance timer;
   determining whether the resonance timer has timed out;
   in response to determining that the resonance timer has not timed out, determining whether the second interrupt has triggered; and
   in response to determining that the second interrupt has triggered, again incrementing the number of cycles of the decaying coil voltage signal.

8. The method of claim 7, further comprising:
   in response to determining that the resonance timer has timed out, determining whether the number of cycles of the decaying coil voltage signal is 0; and
   in response to determining that the number of cycles of the decaying coil voltage signal is not 0, determining the Q-factor of the transmitting coil based on the number of cycles of the decaying coil voltage signal, the reference signal of the first comparator, and the reference signal of the second comparator.

9. The method of claim 1, wherein determining the Q-factor of the transmitting coil comprises calculating the Q-factor according to the following:

$$Q = \frac{\pi * N}{\log\left(\frac{V_1}{V_2}\right)},$$

wherein Q is the Q-factor, N is the number of cycles of the decaying coil voltage signal, V1 is the reference signal of the first comparator, and V2 is the reference signal of the second comparator.

10. The method of claim 1, further comprising:
varying the reference signal of the first comparator to enable multiple points of comparison for the first comparator; and
varying the reference signal of the second comparator to enable multiple points of comparison for the second comparator.

11. A power delivery system, comprising:
a transmitting coil; and
a Universal Serial Bus-Power Delivery (USB-PD) integrated circuit (IC) controller coupled to the transmitting coil, the USB-PD IC controller comprising a first comparator and a second comparator;
wherein the USB-PD IC controller is configured to:
detect a decaying coil voltage signal of a transmitting coil;
use a first comparator to trigger a cycle count of the decaying coil voltage signal, wherein the decaying coil voltage signal is an input signal of the first comparator;
when the first comparator triggers the cycle count, use a second comparator to count a number of cycles of the decaying coil voltage signal, wherein the decaying coil voltage signal is an input signal of the second comparator;
determine a quality factor (Q-factor) of the transmitting coil based on the number of cycles of the decaying coil voltage signal, a reference signal of the first comparator, and a reference signal of the second comparator; and
determine whether a foreign object is present based on the Q-factor and a foreign object detection (FOD) threshold level.

12. The power delivery system of claim 11, wherein the USB-PD IC controller is further configured to:
prior to detecting the decaying coil voltage signal of the transmitting coil, variably excite a resonant tank formed by the transmitting coil and a resonant capacitor.

13. The power delivery system of claim 11, wherein the FOD threshold level is preset or determined based on a reported reference Q-factor.

14. The power delivery system of claim 11, wherein to use the first comparator to trigger the cycle count of the decaying coil voltage signal, the USB-PD IC controller is configured to:
setup the first comparator for a first interrupt to be triggered based on a rising edge of the reference signal of the first comparator and the decaying coil voltage signal.

15. The power delivery system of claim 14, wherein to use the second comparator to count the number of cycles of the decaying coil voltage signal, the USB-PD IC controller is configured to:
setup the second comparator for a second interrupt to be triggered based on a falling edge of the reference signal of the second comparator and the decaying coil voltage signal.

16. The power delivery system of claim 15, wherein the USB-PD IC controller is further configured to:
when the first interrupt and the second interrupt are triggered, determine whether a voltage of the decaying coil voltage signal is above a voltage of the reference signal of the first comparator; and
in response to determining that the voltage of the decaying coil voltage signal is not above the voltage of the reference signal of the first comparator, stop the first comparator and increment the number of cycles of the decaying coil voltage signal.

17. The power delivery system of claim 16, wherein the USB-PD IC controller is further configured to:
start a resonance timer;
determine whether the resonance timer has timed out;
in response to determining that the resonance timer has not timed out, determine whether the second interrupt has triggered; and
in response to determining that the second interrupt has triggered, again increment the number of cycles of the decaying coil voltage signal.

18. The power delivery system of claim 17, wherein the USB-PD IC controller is further configured to:
in response to determining that the resonance timer has timed out, determine whether the number of cycles of the decaying coil voltage signal is 0; and
in response to determining that the number of cycles of the decaying coil voltage signal is not 0, determine the Q-factor of the transmitting coil based on the number of cycles of the decaying coil voltage signal, the reference signal of the first comparator, and the reference signal of the second comparator.

19. The power delivery system of claim 11, wherein to determine the Q-factor of the transmitting coil, the USB-PD IC controller is configured to calculate the Q-factor according to the following:

$$Q = \frac{\pi * N}{\log\left(\frac{V_1}{V_2}\right)},$$

wherein Q is the Q-factor, N is the number of cycles of the decaying coil voltage signal, V1 is the reference signal of the first comparator, and V2 is the reference signal of the second comparator.

20. The power delivery system of claim 11, wherein the USB-PD IC controller is further configured to:
vary the reference signal of the first comparator to enable multiple points of comparison for the first comparator; and
vary the reference signal of the second comparator to enable multiple points of comparison for the second comparator.

\* \* \* \* \*